July 2, 1940.  J. P. REDFEARN  2,206,429
CARPET SWEEPER
Filed Oct. 21, 1936  4 Sheets-Sheet 1
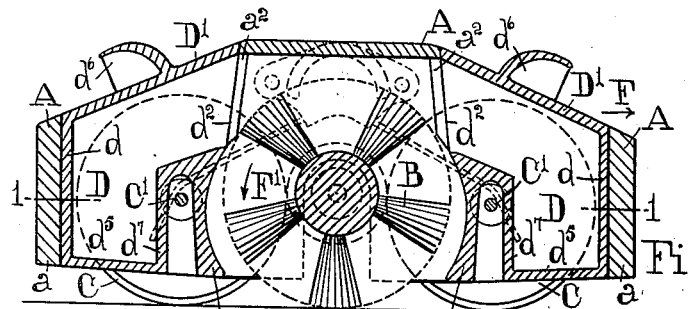
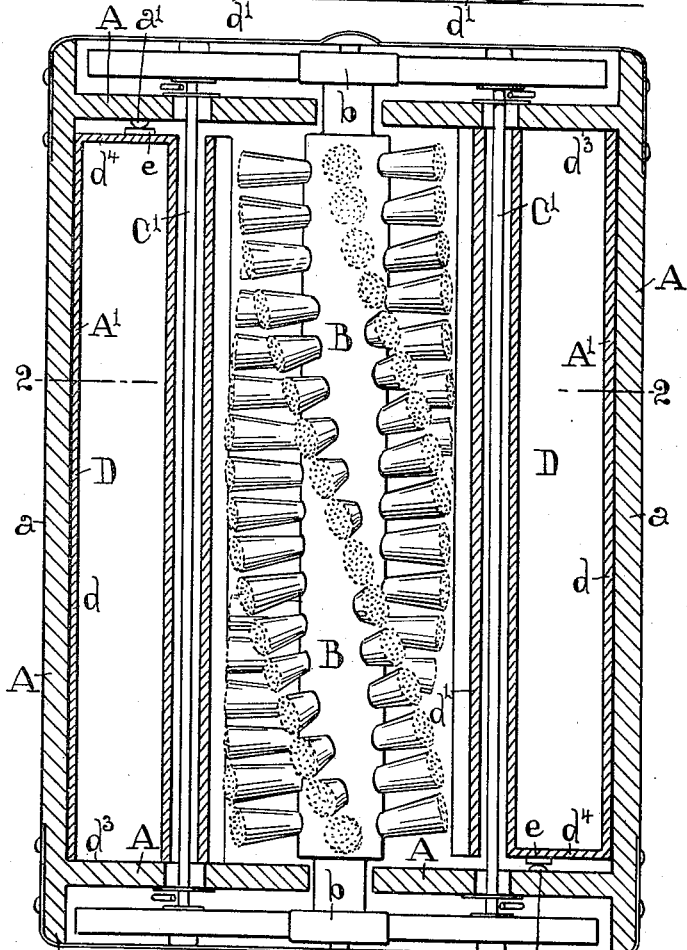
INVENTOR
J. P. Redfearn
J. Owden O'Brien
atty.

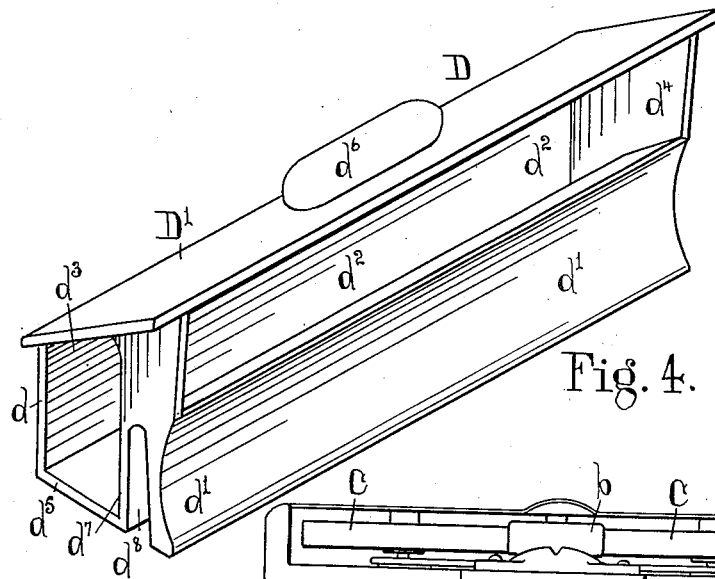
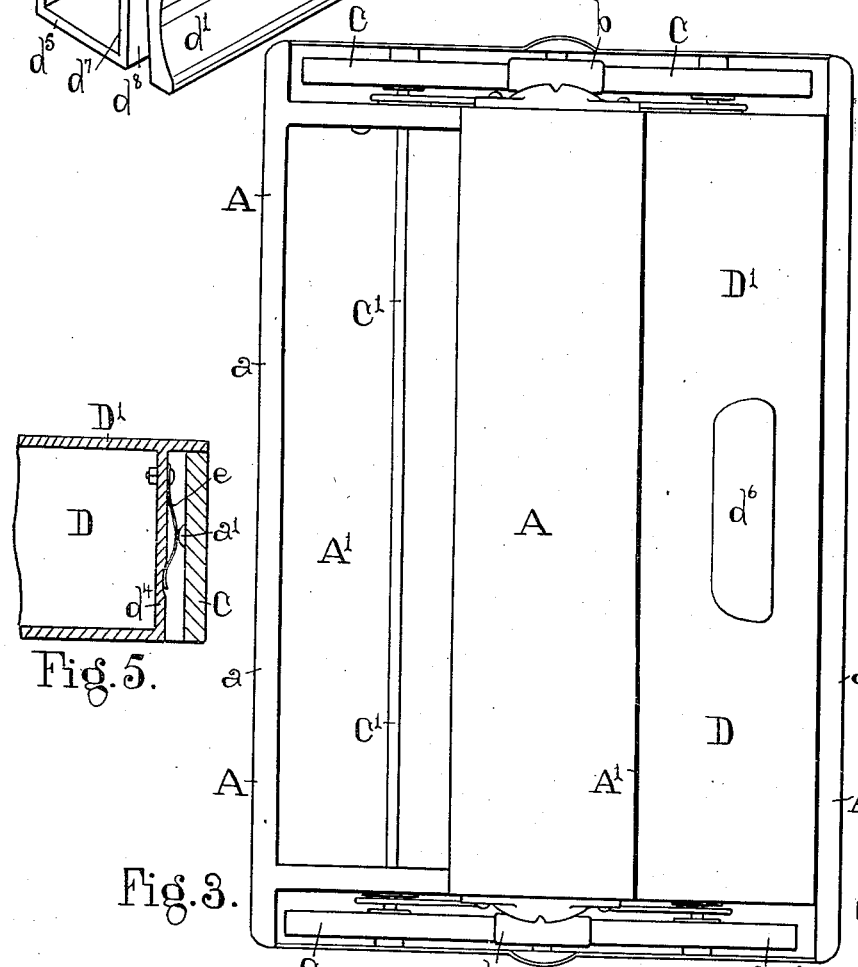

July 2, 1940.                J. P. REDFEARN                2,206,429
                              CARPET SWEEPER
                    Filed Oct. 21, 1936          4 Sheets-Sheet 3
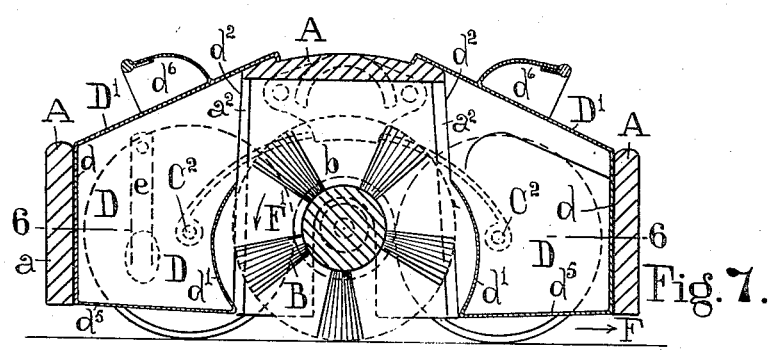
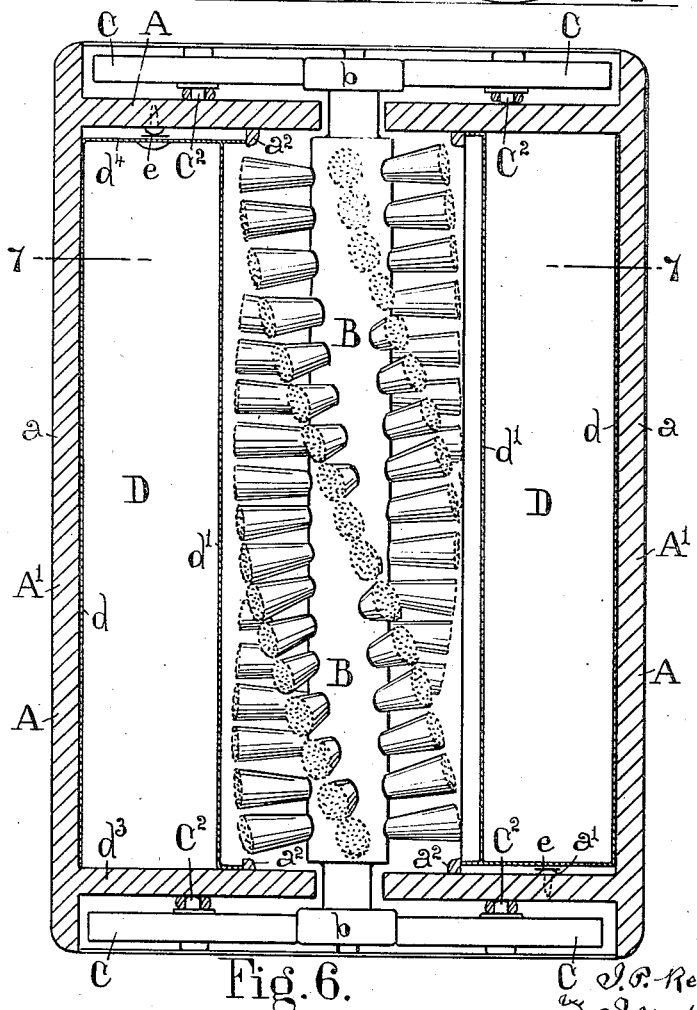
INVENTOR
J. P. Redfearn July 2, 1940.  J. P. REDFEARN  2,206,429
CARPET SWEEPER
Filed Oct. 21, 1936  4 Sheets-Sheet 4

Patented July 2, 1940

2,206,429

UNITED STATES PATENT OFFICE 2,206,429

CARPET SWEEPER

John Percy Redfearn, Accrington, England, assignor to Entwisle & Kenyon Limited, Accrington, Lancaster, England Application October 21, 1936, Serial No. 106,835
In Great Britain May 7, 1936

1 Claim. (Cl. 15—41)

This invention relates to improvements in carpet sweepers of the type having a central brush with a pan or receptacle on each side thereof to receive the dust and litter swept up by the brush and adapted to be inserted and removed through apertures in the top of the casing, the latter of the sweeper being mounted on four wheels which engage pulleys on the brush shaft for the purpose of rotating the brush.

In carpet sweepers of this type the dust pans or receptacles are usually mounted on pivots near the brush about which they can be rotated to discharge the dust and other litter collected therein and although sweepers with such pans or receptacles are in general use they have the disadvantage that the pans or receptacles cannot be completely removed from the casing of the sweeper for emptying their contents and moreover their capacity for holding dust and litter is small.

The object of the invention is an improved construction of dust receptacle to facilitate its insertion into and removal from the casing and the collection of dust and litter therein.

The invention will be described with reference to the accompanying drawings in which two modifications of the invention are shown, Figs. 1 to 5 illustrate the invention as applied to a carpet sweeper of the construction having two longitudinal axles extending from end to end of the casing on which the supporting wheels are mounted and Figs. 6 to 10 illustrate the invention as applied to a carpet sweeper of the construction in which each wheel is mounted separately on a stub axle. In these drawings—

Fig. 1 is a horizontal section of a sweeper embodying the first form of the invention the section being taken on line 1—1 Fig. 2.

Fig. 2 is a transverse section on line 2—2 of Fig. 1.

Fig. 3 is a plan of the sweeper with one of the dust receptacles removed.

Fig. 4 is a perspective view of one of the dust receptacles.

Fig. 5 is a detail view of one end of a dust receptacle showing the spring retaining means for holding it securely in the casing.

Fig. 6 is a horizontal section of a sweeper embodying the second form of the sweeper, the section being taken on line 6—6 of Fig. 7.

Fig. 7 is a transverse section on line 7—7 of Fig. 6.

Figure 9:
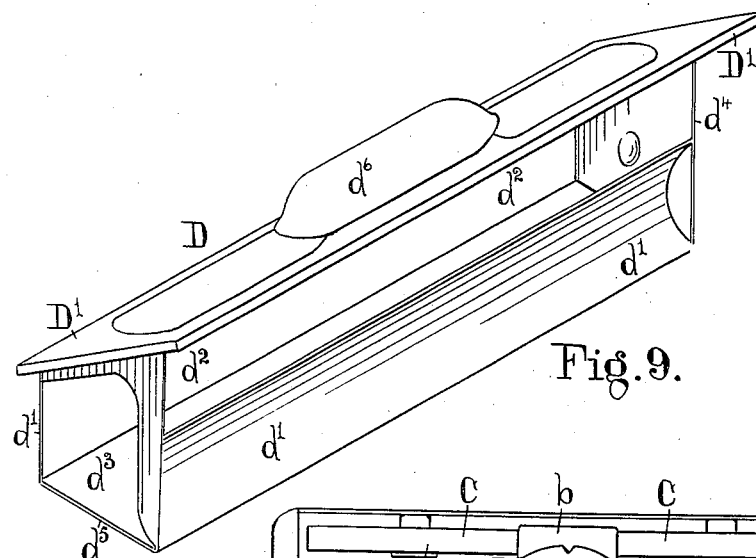
Fig. 9 is a perspective view of one of the dust receptacles.
Figure 10:
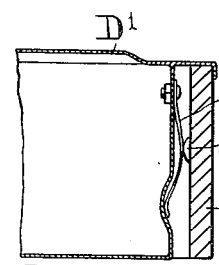
Fig. 10 is a detail view of one end of a dust receptacle showing the spring retaining means for holding it securely in the casing.
Figure 8:
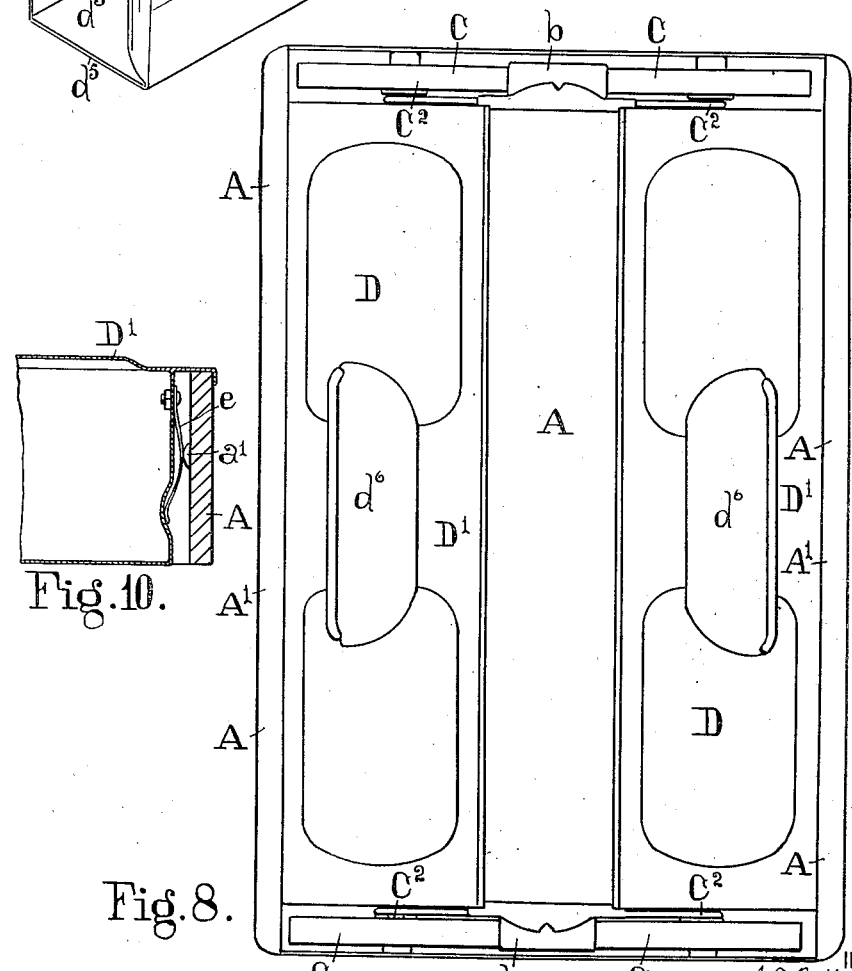
Fig. 8 is a plan of the sweeper.

The sweeper shown in Figs. 1 to 5 is constructed with a casing A, brush B and supporting wheels C mounted on the ends of the longitudinal axles $C^1$ and engaging pulleys $b$ on the end of the shaft of the brush B in the usual way.

The casing A is formed with two openings or apertures $A^1$ in the top thereof of substantially the length of the casing through each of which a separate dust receptacle D can be inserted into and removed from the casing. Each dust receptacle D is of a size and shape as to fill the space in the casing between the brush B and the outer wall $a$ and to extend the whole of the length of the casing and the receptacles are preferably alike and interchangeable. The wall $d$ of the receptacle D which abuts against the outer wall $a$ of the casing corresponds in shape therewith and extends upwards to the top or cover $D^1$ of the receptacle. The inner wall $d^1$ which is adjacent to the brush B is shaped as shown in Figs. 2 and 4 so that it is further away from the brush B at the bottom than at the top thereby forming a hopper like path for the dust and litter as they are flung off the brush. The wall $d$ extends upwards for some distance beyond the central longitudinal axis of the brush B and an opening $d^2$ is formed between the top edge of the wall $d^1$ and the underside of the lid or cover $D^1$ of the receptacle.

One end $d^3$ of the receptacle is open whilst the other end $d^4$ is closed and carries a spring $e$ which engages a projection $a^1$ on the end wall of the casing A when the receptacle is inserted into the latter. The spring $e$ causes a joint to be maintained between the end of the receptacle and the inside of the end of the casing thereby preventing escape of refuse from the receptacle.

If it is desired both ends of the receptacle may be open the retaining spring $e$ being affixed to the end of either the outer wall $d$ or the inner wall $d^1$.

The cover $D^1$ is arranged at such an angle to the bottom $d^5$ of the receptacle as to coincide with the inclination of the top of the sweeper casing and it extends beyond the edges of the ends of the receptacle D whereby when the latter is inserted into the casing A the edges of the cover will rest on the edges of the casing and the aperture $A^1$ and completely close it. The cover $D^1$ is provided with a handle $d^6$ by which it can be lifted out through the top of the casing.

Approximately vertical guides $a^2$ are preferably provided at each end of the casing A to guide the receptacle D into and out of the casing and prevent lateral movement when it has been inserted therein.

It is necessary that the up and down movement of the receptacle D for its insertion into and removal from the casing A should not be prevented by the wheel axle $C^1$ and it is also desirable that the latter should be protected from the dust and litter entering the receptacle, the latter is formed with a second wall $d^7$ arranged in front of the curved wall $d^1$ with a deep groove $d^8$ open at the bottom between them. When the receptacle D is inserted into the casing this groove fits over the axle $C^1$ and prevents the dust and litter entering the receptacle from coming into contact therewith.

The sweeper shown in Figs. 6 to 10 is constructed with a casing A, brush B and supporting wheels C, each wheel C being mounted on a separate stub axle $C^2$ carried by springs or in any other suitable way at the end of the casing A. A pair of wheels C at each end of the casing engage a friction pulley $b$ on the shaft of the brush B in the usual way.

The casing A is formed with two openings or apertures $A^1$ in the top thereof of substantially the length of the casing through each of which a separate dust receptacle D can be inserted into and removed from the casing. Each dust receptacle D is of a size and shape as to fill the space in the casing between the brush B and the outer wall $a$ and to extend the whole of the length of the casing and the receptacles are preferably alike and interchangeable. The wall $d^1$ of the receptacle D which abuts against the outer wall $a$ of the casing corresponds in shape therewith and extends upwards to the top or cover $D^1$ of the receptacle. The inner wall $d^1$ which is adjacent to the brush B is shaped as shown in Figs. 7 and 9 so that it is further away from the brush B at the bottom than at the top thereby forming a hopper-like path for the dust and litter as they are flung off the brush. The wall $d^1$ extends upwards for some distance beyond the central longitudinal axis of the brush B and an opening $d^2$ is formed between the top edge of the curved wall $d^1$ and the underside of the lid or cover $D^1$ of the receptacle.

One end $d^3$ of the receptacle is open whilst the other end $d^4$ is closed and carries a spring $e$ which engages a projection $a^1$ in the end wall of the casing A when the receptacle is inserted into the latter. The spring $e$ causes a joint to be made between the end of the receptacle and the inside of the end of the casing thereby preventing escape of refuse from the receptacle.

The cover $D^1$ is arranged at such an angle to the bottom $d^5$ of the receptacle as to coincide with the inclination of the top of the sweeper casing and it extends beyond the top edges of the receptacle D whereby when the latter is inserted into the casing A the edges of the cover will rest on the edges of the casing around the aperture $A^1$ and completely close it. The cover $D^1$ is provided with a handle $d^6$ by which it can be lifted out through the top of the casing.

Approximately vertical guides $a^2$ are preferably provided at each end of the casing A to guide the receptacle D into and out of the casing and prevent lateral movement when it has been inserted therein.

In this construction where each wheel C is mounted on a separate stub axle $C^2$ and there is no wheel axle extending from end to end of the casing it is not necessary to provide the dust receptacle D with a second wall such as the wall $d^7$ shown in the form of the invention illustrated in Figs. 1 to 5.

The operation of the sweeper is the same in both forms of the invention. When the sweeper is being propelled in the direction of the arrow F and the brush B is consequently rotating in the direction of the arrow $F^1$ the dust and litter is carried up by the brush B over the top thereof and discharged into the rear receptacle D. The travel of the dust and litter is assisted by the curvature of the wall $d^1$ of the receptacle, which is some distance from the brush at the bottom and nearly in contact therewith at the top, giving a hopper-like path to the dust and litter which are flung off the brush above the top of the wall $d^1$ in a tangential direction against the top of the casing and directed thereby into the rear receptacle through the opening $d^2$ above the curved wall $d^1$ thereof.

When the sweeper is propelled in the opposite direction to the arrow F the other receptacle D becomes the rear receptacle and the dust and litter is discharged thereinto over the top of the brush.

To empty the receptacles D it is only necessary to withdraw them upwards through the apertures $A^1$ in the top of the casing A and discharge their contents through the open end $d^3$ into any suitable receiver and to replace them in to the casing.

What I claim as my invention and desire to protect by Letters Patent is:

In a carpet sweeper of the type having a casing, supporting wheels, a central brush and two dust receptacles one at each side of the central brush, a dust receptacle adapted to be inserted and removed through an aperture in the top of the casing comprising in combination a base, an outer wall adjacent to an outer wall of the casing, a curved inner wall adjacent to the brush extending upward from the base beyond the central longitudinal axis of the brush, a wall spaced between the inner wall and the outer wall to form a deep groove in the underside of the receptacle into which the longitudinal axle carrying the wheels is received and by which it is protected when the receptacle, is in use, a closed wall at one end of the receptacle, a second wall at the opposite end of the receptacle maintained in dust tight engagement with the corresponding end of the casing and having an aperture therein for the discharge of dust and litter, said end walls extending above the top of the inner wall, spring means between the closed end wall of the receptacle and the corresponding end of the casing maintaining the dust tight engagement of the open end of the receptacle with the corresponding end of the casing, and a cover attached to the outer wall and the end walls thereby leaving an aperture between the top of the inner wall and the cover through which dust and litter can enter the receptacle, said spring means comprising a bowed spring affixed at one end to the outer surface of an end of the receptacle to engage a projection on the inside of the casing to retain the receptacle in position therein.

JOHN PERCY REDFEARN.